Sept. 22, 1931.     D. G. ROOS     1,824,734

VALVE SPRING CONTROL FOR INTERNAL COMBUSTION ENGINES

Filed May 20, 1929

INVENTOR
Delmar G Roos
BY
ATTORNEY

Patented Sept. 22, 1931

1,824,734

UNITED STATES PATENT OFFICE

DELMAR G. ROOS, OF SOUTH BEND, INDIANA, ASSIGNOR TO THE STUDEBAKER CORPORATION, OF SOUTH BEND, INDIANA, A CORPORATION OF NEW JERSEY

VALVE SPRING CONTROL FOR INTERNAL COMBUSTION ENGINES

Application filed May 20, 1929. Serial No. 364,495.

This invention relates to internal combustion engines having valve springs and particularly to means for arresting the surging of the springs to thereby prevent the breakage of the same.

The principal object of this invention is to provide a damping means for a valve spring which will absorb energy therefrom to thus prevent synchronous vibration thereof and the breakage of the same.

A further object is to provide a spring movable in conjunction with a valve spring having friction means applied thereto for damping the movement of the valve spring and thus arresting the surging thereof.

A still further object is to provide a spring movable in series with a valve spring having friction means extending parallel with the spring for damping the movement of the valve spring and thus arresting the surging thereof.

The above and other objects relating to certain features of construction and combination of parts to be hereinafter described with reference to the accompanying drawings, and then claimed, will be apparent from the detailed description to follow.

Figure 1:
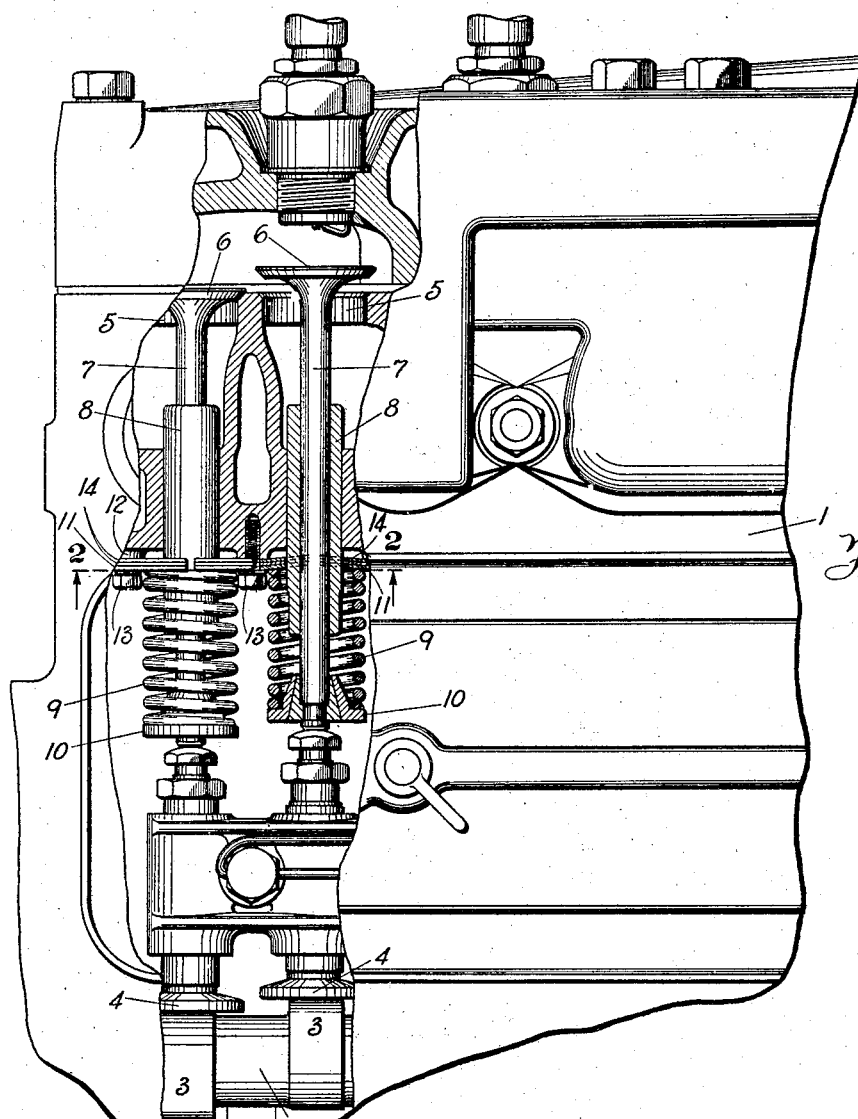

In the drawings which illustrates a suitable embodiment of the present invention, Figure 1 is a fragmentary side elevation of an internal combustion engine, certain parts being broken away and in section to show my invention applied thereto.

Figure 2:
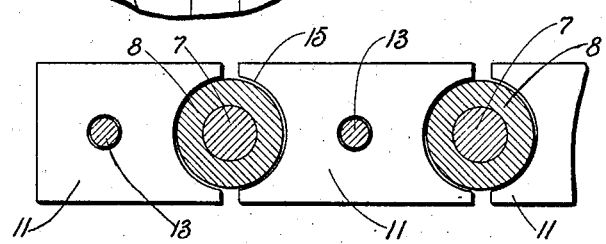

Figure 2 is a detailed section taken on the line 2—2 of Figure 1, showing the means for arresting the surging of the valve spring.

Heretofore the surging of valve springs has been a serious problem and has caused considerable trouble and expense to the owner of the vehicle in which the engine forms a part due to noisy valve springs and the breakage of the same. As valve springs are necessary in internal combustion engines of the poppet valve type now accepted as the standard design of engines, the troubles encountered due to the surging of the springs causing the breakage of the springs has been one of the serious problems which engineers have sought to solve, but so far as I am aware no one has heretofore successfully eliminated this difficulty.

Having the above and other difficulties in mind, I have provided a means which will absorb energy from the valve spring so as to damp out or arrest the surging thereof and which will, therefore, materially increase the life of the spring and prevent the breakage of the same.

In the drawing in which like numerals refer to like parts throughout the several views, I have shown for the purpose of illustration, an internal combustion engine 1 having a cam shaft 2 therein on which are a plurality of cams 3 adapted to operate valve tappets 4 movable to open and close the valve ports 5 by means of the valve 6 having valve stems 7 guided in bushings 8 mounted in the internal combustion engine 1. The opening of the valve ports 5 by the valves 6 is resisted by the coil springs 9 which seat at their lower ends on the spring supports 10 attached to the valve stems 7.

So far as my invention is concerned the valves and their associated parts shown in the accompanying drawings are identical in form and construction. Therefore, I will describe the means for arresting the surging of only one of the valve springs. The valve spring 9 seats at its upper end on a flat spring 11 which is secured to a boss 12 on the engine 1 by means of the screw 13. Positioned between the spring leaf 11 and the boss 12 are a plurality of spring leaves 14 similar in design to the spring 11 cooperating therewith for a purpose to be hereinafter described. During each revolution of the cam shaft 2 the cam 3 will operate to raise the tappet 4 and thus move the valve 6 vertically to open the valve port 5. In so doing the valve spring 9 will be compressed between the valve support 10 and the spring 11 and as the inner end of the spring 11 is unsupported the same will cause to move in series with the valve spring 9. The movement of the spring 11 is resisted because of the friction set up by the springs 14 interposed between the spring 11 and the boss 12 when the valve spring 9 is compressed between said spring 11 and the valve spring support 10. In order that the valve spring 9 may have a substantial seat on the flat spring 11 the same is cut out at 15 to seat around the bushing 8 as is clearly shown in Figure 2.

Heretofore I have mentioned only one spring 11 but it is to be understood that if desired a series of these springs may be used preferably extending longitudinally of the engine 1, the springs 11 being mounted on the bosses 12 so that each spring fits around the bushings 8 in the manner which is clearly shown in Figure 2.

It will thus be seen from the foregoing description that the springs 11 have limited movement when the valve spring 9 is compressed and that the movement is resisted because of the springs 14 which as illustrated may be identical in shape and form with the spring 11 but which retards the free movement thereof. Because of the resilient support for the upper end of the spring 9 it will not have the tendency to surge as in the conventional constructions but instead the vibratory movement thereof will be damped out by the spring 11 and surging thereof will be prevented because of the frictional resistance to its movement by the springs 14.

While I have accomplished the desired result and the foregoing description is necessarily of a detailed character in order that the invention may be completely set forth, it is to be understood that formal changes and changes relating to details of construction and modification of parts may be resorted to without departing from the scope or spirit of the invention as herein claimed.

What I claim is:

1. Means for damping a valve spring comprising, a spring contacting with an end of said valve spring, and means for damping said second named spring.

2. Means for damping a valve spring comprising, a spring contacting with an end of said valve spring, and spring means for damping said second named spring.

3. Means for damping a valve spring comprising, a spring member extending perpendicularly to the longitudinal axis of said valve spring and contacting with an end thereof, and means frictionally engaging said spring member for resisting the movement thereof.

4. Means for damping a valve spring comprising, a spring member extending perpendicularly to the longitudinal axis of said valve spring and contacting with an end thereof, and a plurality of spring members extending parallel with and frictionally resisting movement of said spring member.

5. Means for arresting the surging of a valve spring comprising, a second spring movable in conjunction therewith, and means for resisting the movement of said second spring.

6. Means for arresting the surging of a valve spring comprising, a second spring extending transversely of said valve spring and contacting therewith, and means for resisting the movement of said second spring.

7. Means for arresting the surging of a valve spring comprising, a flat leaf spring extending transversely of said valve spring and contacting therewith, and means for resisting the movement of said flat spring.

8. Means for arresting the surging of a valve spring comprising, a member resiliently supporting an end of said valve spring, and friction means for resisting deflection of said supporting member.

9. Means for arresting the surging of a valve spring comprising, a member resiliently supporting an end of said valve spring, and spring means for resisting deflection of said supporting member.

10. In a device of the class described, a valve spring, a second spring movable in series therewith, and means for resisting movement of said second spring to thereby prevent synchronous vibration of said valve spring.

Signed by me at South Bend, Indiana, this 16th day of May, 1929.

DELMAR G. ROOS.